United States Patent
Bohori et al.

(10) Patent No.: US 8,292,052 B2
(45) Date of Patent: Oct. 23, 2012

(54) POWER TRANSFER SYSTEM AND METHOD

(75) Inventors: Adnan Kutubuddin Bohori, Bangalore (IN); Ajith Kuttannair Kumar, Erie, PA (US); Bret Dwayne Worden, Erie, PA (US); James William Bray, Niskayuna, NY (US); Somakumar Ramachandrapanicker, Bangalore (IN); Arvind Kumar Tiwari, Bangalore (IN); Suma Memana Narayana Bhat, Bangalore (IN)

(73) Assignee: General Electric Company, Niskayuna, NY (US)

( * ) Notice: Subject to any disclaimer, the term of this patent is extended or adjusted under 35 U.S.C. 154(b) by 77 days.

(21) Appl. No.: 12/822,232

(22) Filed: Jun. 24, 2010

(65) Prior Publication Data

US 2011/0315496 A1 Dec. 29, 2011

(51) Int. Cl.
*B60L 9/00* (2006.01)
*H01F 38/00* (2006.01)

(52) U.S. Cl. .......................................... 191/10; 307/104

(58) Field of Classification Search .................... 191/10; 307/104, 9.1; 180/2, 1, 165, 2.1; 320/108, 320/109
See application file for complete search history.

(56) References Cited

U.S. PATENT DOCUMENTS

| | | | | |
|---|---|---|---|---|
| 5,669,470 A * | 9/1997 | Ross | ............................... | 191/10 |
| 5,788,033 A | 8/1998 | Lucking et al. | | |
| 5,821,638 A * | 10/1998 | Boys et al. | ...................... | 307/104 |
| 5,831,841 A | 11/1998 | Nishino | | |
| 6,317,338 B1 * | 11/2001 | Boys | ................................. | 363/25 |
| 6,397,990 B1 * | 6/2002 | Brien et al. | ...................... | 191/10 |
| 6,978,873 B2 * | 12/2005 | Ishioka | ............................ | 191/10 |
| 7,521,890 B2 | 4/2009 | Lee et al. | | |
| 7,880,337 B2 * | 2/2011 | Farkas | ........................... | 307/104 |
| 2005/0087339 A1 | 4/2005 | Schultz et al. | | |
| 2008/0260323 A1 | 10/2008 | Jalali et al. | | |
| 2010/0148589 A1 | 6/2010 | Hamam et al. | | |
| 2010/0171368 A1 | 7/2010 | Schatz et al. | | |
| 2010/0181843 A1 | 7/2010 | Schatz et al. | | |
| 2011/0049978 A1 * | 3/2011 | Sasaki et al. | ................... | 307/9.1 |

(Continued)

FOREIGN PATENT DOCUMENTS

WO 0171882 A1 9/2001

(Continued)

OTHER PUBLICATIONS

A world-premiere:contactless power transfer for urban rail vehicles; EcoActive Technologies; PRIMOVE Catenary-Free Operation; Light Rail Vehicles, eco4 Bombardier; URL : http://www.bombardier.com/files/en/supporting_docs/BT-ECO4-PRIMOVE.pdf.

(Continued)

*Primary Examiner* — S. Joseph Morano
*Assistant Examiner* — Zachary Kuhfuss
(74) *Attorney, Agent, or Firm* — Ann M. Agosti (57) ABSTRACT

A contactless power transfer system for a mobile asset is presented. The system includes a primary loop disposed adjacent to a location that is coupled to a power source. A secondary receiving coil is disposed on the mobile asset and coupled to a traction motor for receiving power from the primary loop. The power transfer system further includes a field-focusing element that can focus a magnetic field from the primary loop onto the secondary receiving coil, the field-focusing element having a non-linear current distribution.

17 Claims, 5 Drawing Sheets

U.S. PATENT DOCUMENTS

| | | | | |
|---|---|---|---|---|
| 2011/0253495 | A1* | 10/2011 | Vollenwyder et al. | 191/10 |
| 2011/0259694 | A1* | 10/2011 | Matsumura | 191/10 |
| 2011/0278940 | A1* | 11/2011 | Krishna et al. | 307/104 |

FOREIGN PATENT DOCUMENTS

| | | |
|---|---|---|
| WO | 2004062959 A1 | 7/2004 |
| WO | 2007108586 A1 | 9/2007 |

OTHER PUBLICATIONS

Adnan Bohori et al., "Contactless Power Transfer System," U.S. Appl. No. 12/845,133, filed Jul. 28, 2010.

Adnan Bohori et al., "Contactless Power Transfer System," U.S. Appl. No. 13/096,372, filed Apr. 28, 2011.

S. Fenton et al., "Electrical Coupling Apparatus and Method," U.S. Appl. No. 12/778,475; filed May 12, 2010.

Adnan Bohori et al; "System and Method for Contactless Power Transfer in Portable Image Detectors," U.S. Appl. No. 13/149,170, filed May 31, 2011.

Adnan Bohori et al.,"Contactless Power Transfer System," U.S. Appl. No. 12/820,208, filed Jun. 22, 2010.

Adnan Bohori et al., "Systems for Contactless Power Transfer," U.S. Appl. No. 12/914,512, filed Oct. 28, 2010.

Adnan Bohori et al.,"System and Method for Contactless Power Transfer in Implantable Devices," U.S. Appl. No. 13/052,196, filed Mar. 21, 2011.

Adnan Bohori et al, "Contactless Power Transfer System and Method," U.S. Appl. No. 12/731,497, filed Mar. 25, 2010.

Adnan Bohori et al, U.S. Appl. No. 12/731,497, US Non-Final Office Action Rejection Jan. 19, 2012.

* cited by examiner

POWER TRANSFER SYSTEM AND METHOD

BACKGROUND

1. Technical Field

Embodiments of the invention relate to power transfer systems and methods.

2. Discussion of Related Art

A traction motor can drive an electric vehicle that draws power from catenary distribution systems via pantographs during use. Conventional catenary distribution systems may maintain a location of the electrified overhead conductor (from which power is drawn) relative to the track centerline at an essentially fixed position. Vertical and lateral positions of the electrical conductor are disposed within close limits.

Currently available overhead catenary systems may sag between supports, requiring an overhead conductor be suspended from hangers that are attached to a load-bearing messenger cable at close intervals. Spacing between stanchions must be limited or lateral support must be provided to keep the overhead conductor within specified lateral (stagger) tolerances. These tolerances may be difficult to achieve along curved tracks.

Conventional catenary systems may need relatively complex designs, as the overhead conductor must closely follow the track centerline. Moreover, stanchions may require heavy anchoring to support heavy cantilever loads of the cross-arms, cables, and hangers.

It may be desirable to have a catenary system or a power transfer system that differs from those systems that are currently available. It may be desirable to have a method of power transfer that differs from currently available methods.

BRIEF DESCRIPTION

In one embodiment, a power transfer system for mobile asset is disclosed. The power transfer system includes a primary loop disposed adjacent to a location that is coupled to a power source. A secondary receiving coil is disposed on a mobile asset and is coupled to a traction motor for receiving power from the primary loop. The power transfer system further includes a field-focusing element that can focus a magnetic field from the primary loop onto the secondary receiving coil, and the field-focusing element has a non-linear current distribution.

In another embodiment, a method of transferring power is proposed. The method includes transmitting power from a power source coupled to a primary loop onto a secondary receiving coil while focusing a magnetic field from the primary loop onto the secondary receiving coil.

DRAWINGS

These and other features and aspects of the invention are disclosed with reference to the following detailed description and the accompanying drawings in which like characters represent like parts throughout the drawings, wherein.

DETAILED DESCRIPTION

Embodiments of the invention relate to a power transfer system and an associated method. Particularly, a power transfer system for use with a mobile asset is provided for herein, and in which the power transfer may be contactless.

By contactless, it is meant that a power cord, wire, or other tangible electrical conduit is absent for at least a portion of a power transfer circuit. Unless otherwise indicated by context or explicit language, power, as used herein, refers to electrical power or electricity. A mobile asset can include any non-fixed item of equipment, and specifically includes at least self-propelled vehicles. Examples of such vehicles can include passenger vehicles, mass transit vehicles, locomotives, and industrial equipment (e.g., forklifts and loaders). Other examples can include mining equipment and semi-portable devices. Further, instances are contemplated where the asset itself is fixed, but the power source for the power transfer system is relatively mobile. Yet other examples of mobile asset may include a hauling vehicle, such as a tram or a carriage of an electric train with each carriage requiring its own source of power. The terms "primary loop" and "secondary receiving coil" are provided with reference to the directional flow of power. In certain instances, power flow may be bi-directional, and the terms may be interchanged with each other.

Figure 1:
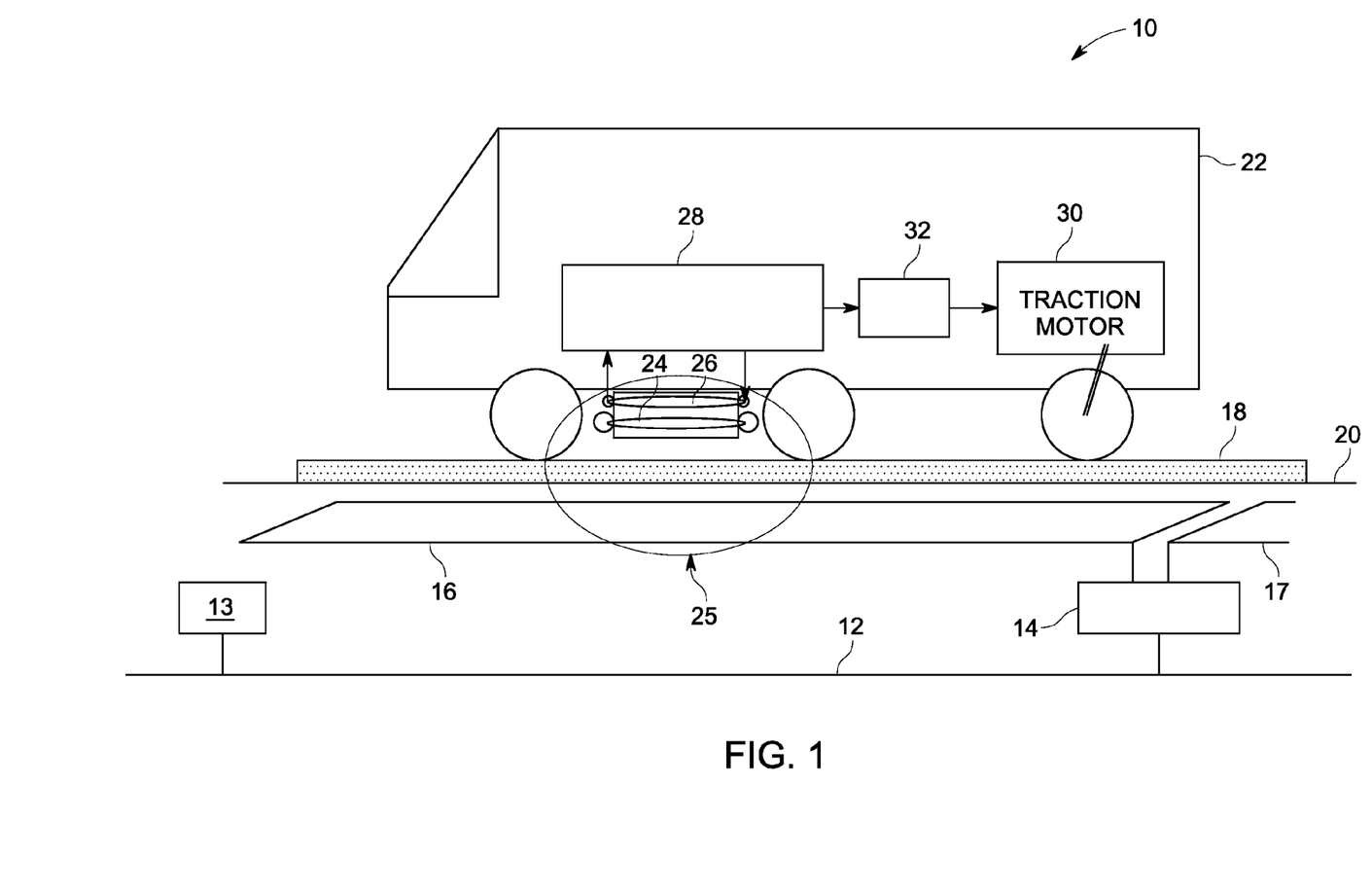
FIG. 1 illustrates a block diagram of a transportation system implementing a contactless power transfer system according to an embodiment of the invention.

A block diagram of a transportation system 10 implementing a contactless power transfer system 25 according to an embodiment of the invention is shown with reference to FIG. 1. The power transfer system includes a power transmission line 12, an inverter 14, a primary loop 16, a pathway or track 18 at ground level 20, a mobile asset 22, a field-focusing element 24, a secondary receiving coil 26, a cyclo-converter 28, a traction motor 30, and a filter 32. The primary loop may be coupled to power transmission line 12 through inverter 14. A suitable underground transmission line (configured as a power source in the illustrated embodiment). In one embodiment, the underground transmission line is a DC power transmission line. Generally, the underground transmission lines are coupled to a power source 13 such as utility grid depending on the system design. Depending on the specific application, underground DC transmission lines may include transmission voltages of about 20 kV to about 30 kV. The inverter converts DC power into high frequency AC power. For purposes of this example, the inverter may convert DC power in the range of about 100 kHz to about 900 kHz. The primary loop may be disposed adjacent to the stationary pathway or track. Multiple segments of primary loops (such as that illustrated by the partially shown primary loop 17) may be disposed along the route. In some embodiments, the primary loop may be disposed between the stationary tracks and embedded within the ground. However, in certain embodiments primary loop may be disposed above the ground level.

In some embodiments, a mobile asset 22 may be disposed on stationary tracks 18 that may haul multiple carriages (not shown). A secondary receiving coil may be disposed on the mobile asset.

In one embodiment, a field-focusing element may be disposed on the mobile asset. The field-focusing element may alternatively be disposed on the stationary tracks proximate, or relatively closer to, the primary loop. The field-focusing element may include multiple resonators, which may be provided in sets. The field-focusing element may have at least two sets of self-resonant frequencies that are, in a sense, unique or at least that differ from each other. The field-focusing element can focus a magnetic field from the primary loop on to the secondary receiving coil. In one embodiment, the field-focusing element includes a single loop coil. In another embodiment, the field-focusing element includes multiple turns such as in a split ring structure, spiral structure, Swiss-roll structure, or helical coil. Selection of a structure for a particular application is determined by the size and self-resonating frequency of the field-focusing element. For example, in low power applications (less than about 1 Watt, for example), a resonance frequency up to about 1000 MHz is feasible. In high power applications (from about one hundred Watts to about 500 kilowatts, for example), a resonance frequency of the order of several hundreds of kilohertz is feasible. In certain applications, the choice of frequency and hence the design of the field-focusing element is driven by the restrictions on human exposure to high frequency electric and magnetic fields.

Swiss-roll coils may be implemented as field-focusing elements to provide a compact resonator that may be configured to operate at frequencies from about 100 kHz up to about 100 MHz. Embodiments of field-focusing elements such as Swiss-Roll coils may be used to provide extended magnetic field focusing strength and help achieve increased capacitance and inductance and hence a compact design due to size reduction in the spatial structure of the coils. A single Swiss Roll resonator is expected to be capable of focusing a magnetic field up to few inches of distance.

A helical structure is a wire wound in the form of a helix. A helical structure, when used as a magnetic field-focusing element, can achieve a high Q factor. In one embodiment, coating the surface of the conductor in the helical structure with high conductivity material helps minimize skin effects in the magnetic field-focusing element at high frequencies and hence enables the higher Q factor. Helical resonators are analogous to an array of dipoles and loops. Helical structures are designed for focusing magnetic field in an axial direction by optimizing the pitch and number of turns.

In certain embodiments a plurality of resonators are arranged in an array and implemented as a field-focusing element. An array of resonators constitutes multiple resonator coils arranged in a particular array arrangement, such as a linear or planar array, that is excited with a specific phase relationship. Individual resonators or sub wavelength resonators are configured to focus the magnetic field in a desired direction. In such an arrangement, fields from resonators in the array interfere constructively (add) in a desired direction to achieve magnetic field focusing and interfere destructively (cancel each other) in the remaining space. Resonators are arranged in at least one of a linear, a circular, a planar, or a three-dimensional array. Individual resonators may be arranged in a row and multiple such rows may be arranged one below the other. Individual resonators that are part of the array are collectively configured for at least one or more resonant frequencies. In a particular embodiment, all of the individual resonators of the array are identical.

In an exemplary embodiment, a few individual resonators are excited at different phases such that field focus is achieved in desired direction. Total field of an array is determined by the vector addition of the fields from individual resonators. When parameters of the individual resonators or of the resonator sets are varied, such variations may be selected to shape the overall field pattern of the array. Different ways to provide variation include, for example, geometrical configurations (linear, circular, rectangular, spherical, etc.), relative displacement between the resonators, excitation amplitude of the individual resonators, excitation phase of the individual resonators, and relative pattern of the individual resonators.

In yet another embodiment, first set of resonators is configured for a first resonance frequency and a second set of resonators is configured for a second resonance frequency. In such a configuration, power may be transferred through the first set of resonators and data on the second set of resonators. Alternatively, bi-directional power may be transferred using the array. For example, power is simultaneously transferred in one direction via a first resonator set and data in an opposite direction avia second set of resonators.

Various excitation schemes may be implemented on individual resonators of the array. One such example includes exciting all the individual resonators in the array to form an active array. Amplitude and phase of the excitation on each resonator may be controlled to change the direction of a respective magnetic beam to achieve active beam steering.

In another embodiment, a single resonator may be excited while the other resonators are electromagnetically coupled to the excited resonator to form a passive array. Such passive arrays generate an elongated magnetic field focusing beam that enables power transfer efficiently up to a few meters of distance.

In another embodiment, the array includes an individual resonator of the sub-wavelength dimension forming a passive structure. None of the resonators are specifically excited. However, when they are placed near a magnetic field, the array will focus the magnetic field. Spatial disposition of such passive structures are designed to result in effective negative permeability.

If desired, a resonator or an array of resonators can be embedded in a material having high dielectric constant (dielectric permittivity) or a magnetic material having high permeability or magneto-dielectric medium having high dielectric permittivity and high permeability to achieve lower resonant frequency with a smaller sized resonator. High permeability material enhances self-inductance of the resonator, and high permittivity material enhances self-capacitance of the resonators to reduce the frequency of resonance. In another embodiment, high permeability materials are also configured to increase the coupling between the primary coil, the field-focusing element, and the secondary coil. Materials such as but not limited to barium strontium titanate are an example of materials exhibiting a high dielectric constant.

The secondary receiving coil may be coupled to a cyclo-converter 28 to convert high frequency AC power received form the primary loop into lower frequency AC power that may directly feed a traction motor 30. In one embodiment, the power rating of the cyclo-converter may be in the range of about 0.5 MW to about 5 MW. In embodiments, such as wherein a DC motor is configured as the traction motor, the cyclo-converter block may be eliminated. In another example embodiment, a synchronous machine configured to operate at about 100 Hz may be implemented as the traction motor. The traction motor may be coupled to wheels of the mobile asset and configured as a prime mover to propel the mobile asset. A filter may be coupled between the cyclo-converter and the traction motor to filter out harmonics and other noise that may have been transmitted from the power source.

In one embodiment, during braking of the mobile asset, energy may be transmitted from the secondary receiving coil to the primary loop and back to the power source. The mobile asset may utilize two or more self-resonant frequencies and may be selected so as to simultaneously transfer power and data signals. In another exemplary embodiment, two or more self-resonant frequencies of the field-focusing element may be selected so as to simultaneously transfer power and data signals between the secondary receiving coils and the primary loop.

Figure 2:
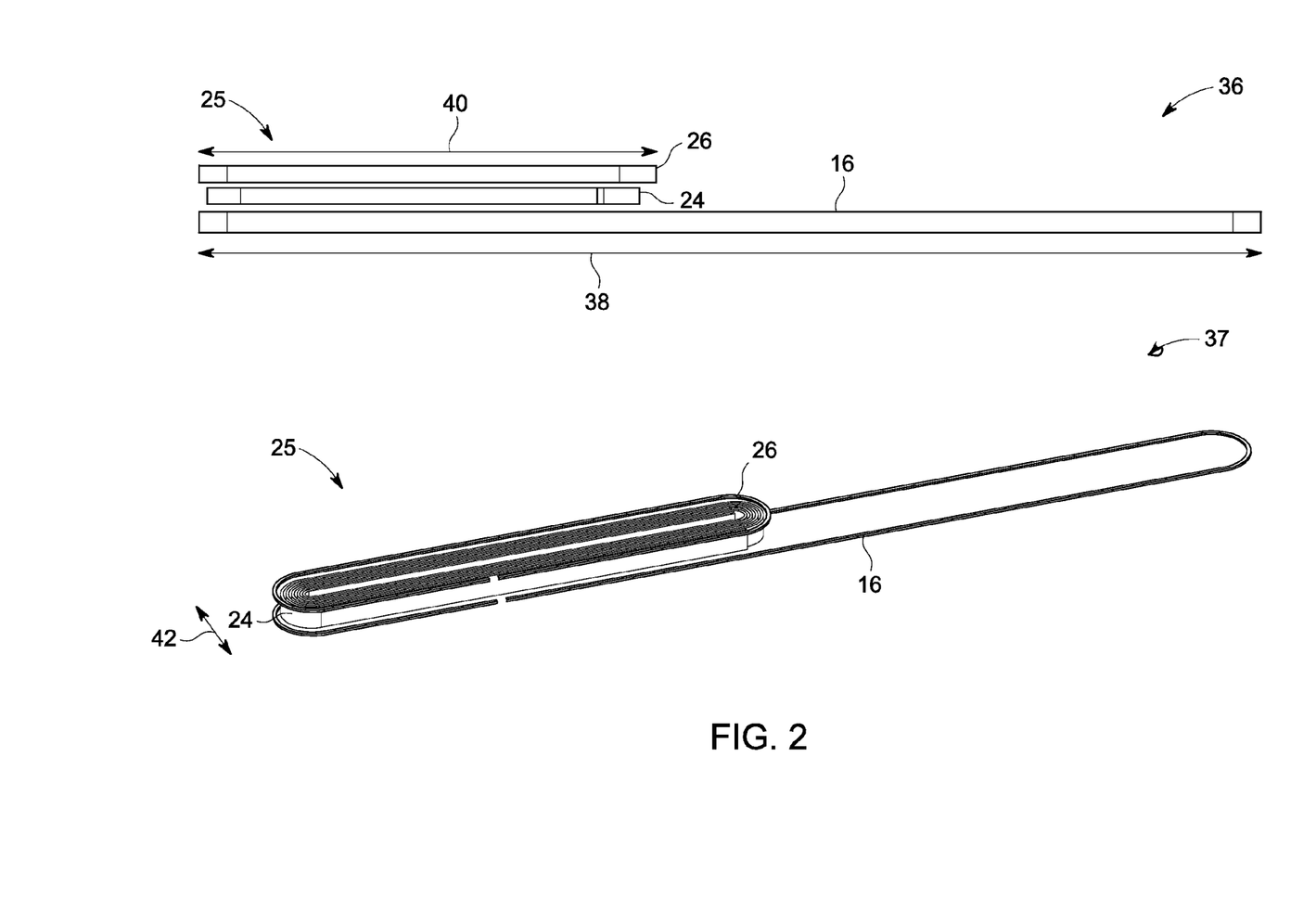
FIG. 2 illustrates a detailed view of a contactless power transfer system according to an embodiment of the invention.

A detailed view of a power transfer system according to an embodiment of the invention is shown with reference to FIG. 2. A profile view 36 of the contactless power transfer system 25 illustrates the primary loop, the field-focusing element 24, and the secondary receiving coil. As discussed earlier, in one embodiment, the primary loop may be disposed proximate stationary tracks, and the field-focusing element and the secondary receiving coil may be disposed on the mobile asset. In an exemplary embodiment, the length 38 of the primary loop may be about 20 meters, the length 40 of the secondary receiving coil may be about 10 meters, and the width 42 of the primary loop and the secondary receiving coil may be about 1.5 meters as illustrated in a top view 37. Multiple such primary loops may be disposed along the length of the track and coupled to transmission lines for supplying power.

Figure 3:
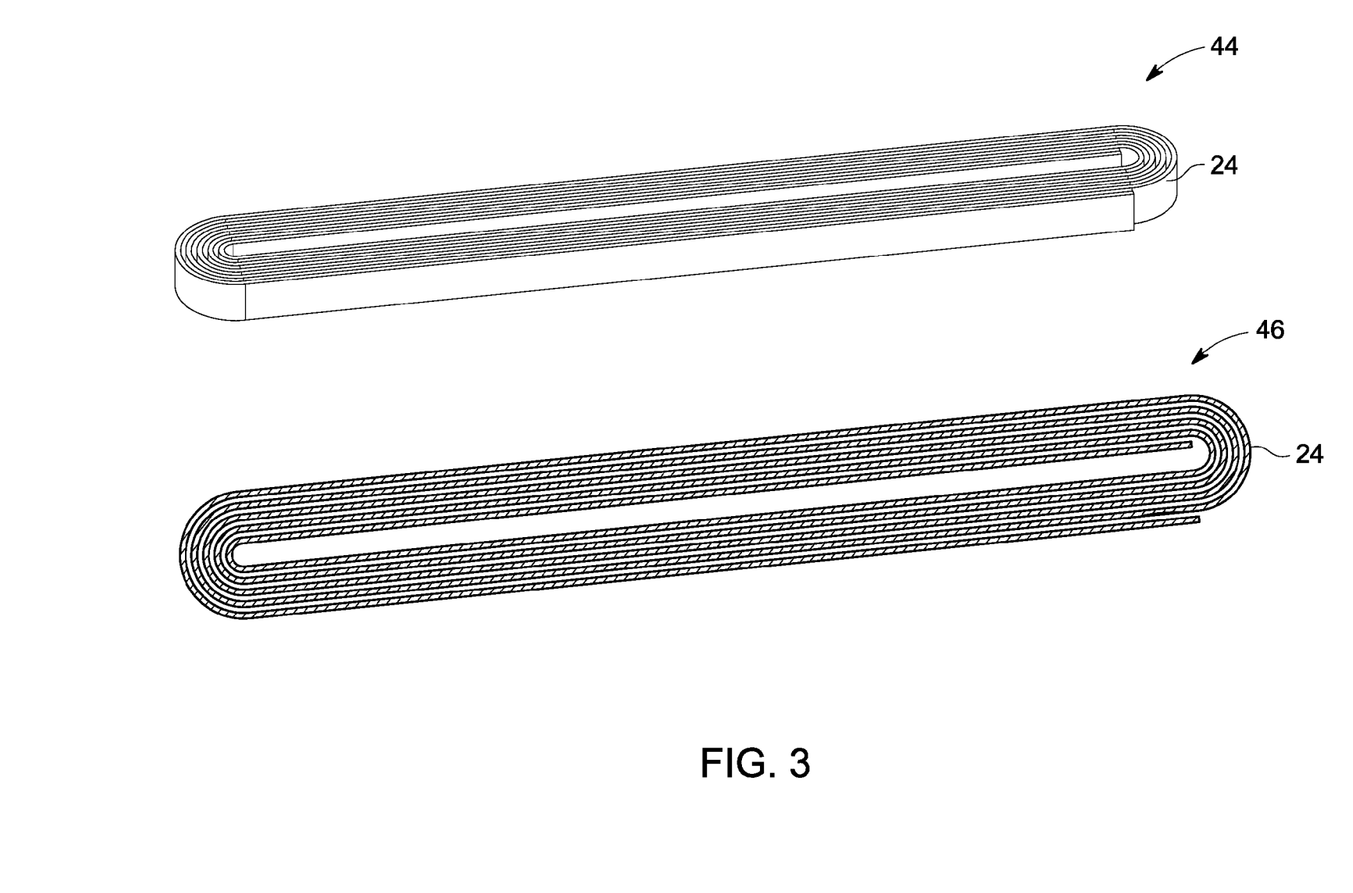
FIG. 3 illustrates a detailed view of a field-focusing element according to an embodiment of the invention.

FIG. 3 illustrates a detailed view of a field-focusing element according to an embodiment of the invention. A profile view 44 of the field-focusing element includes a single conductor wound concentrically with gaps between turns as seen clearly in the top view 46. The field-focusing element may be a self-resonating structure made from at least one of a conducting material, a dielectric material, a ferromagnetic material, or a combination thereof. During operation when the primary loop may be excited at the resonance frequency, a non-linear current such as a standing current wave pattern may be developed on the surface of field-focusing element resulting in focused magnetic field and an enhanced coupling.

Such configurations of field-focusing elements, such as those including multiple coils and having two or more resonant frequencies, may be implemented in a contactless power transfer system. For example, the field-focusing element may include a helical coil, a spiral, a dipole, or a Swiss roll structure. Such structures may further be embedded within a dielectric or ferromagnetic material. In one embodiment, the field-focusing element may include an array of multiple structures with pre-designed phase relationships.

Figure 4:
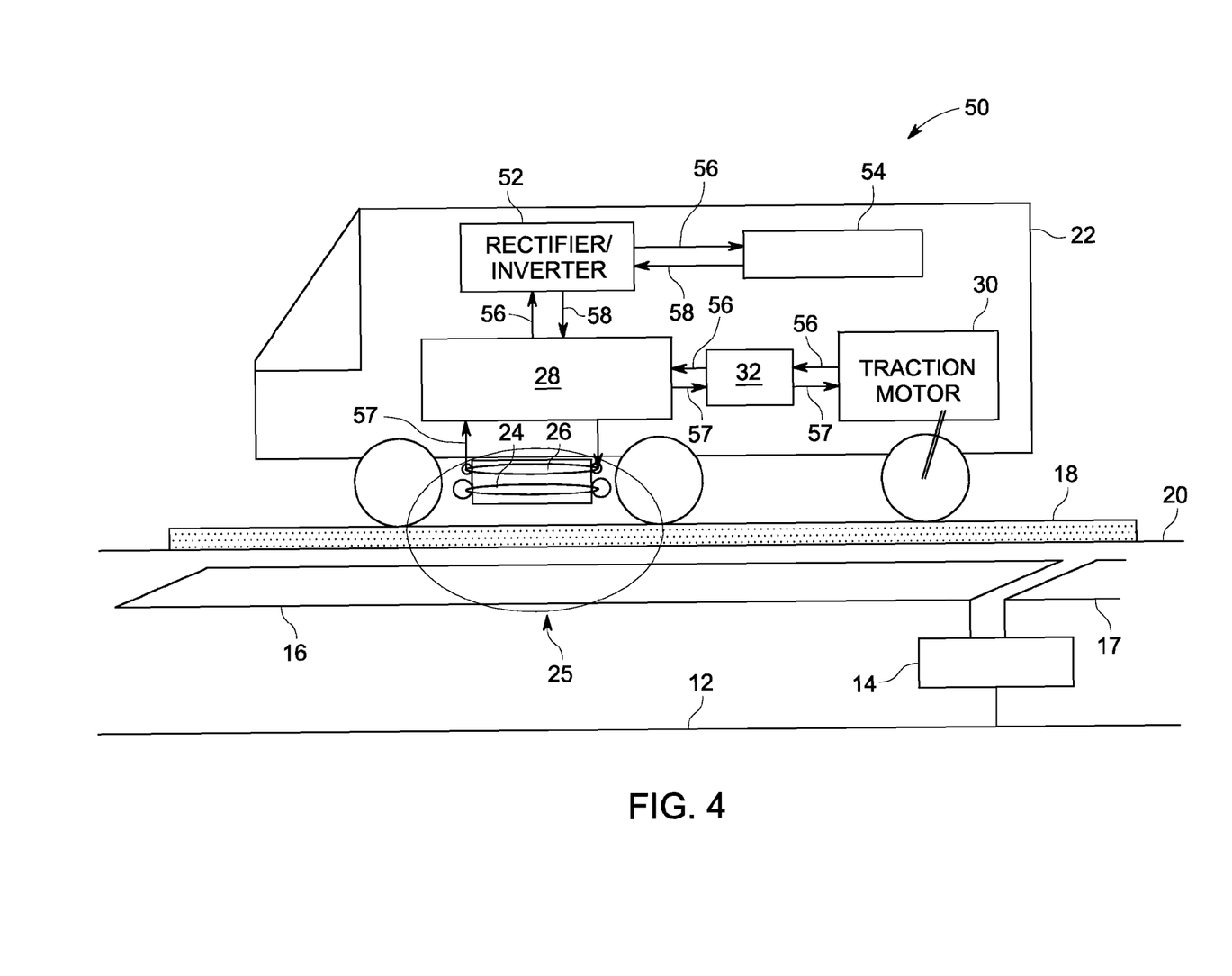
FIG. 4 illustrates an exemplary mobile asset powered by a contactless power transfer system that includes a storage module according to an embodiment of the invention.

FIG. 4 illustrates a mobile asset powered by a contactless power transfer system that includes a storage module according to an embodiment of the invention. Mobile asset 50 may be similar to the earlier disclosed mobile asset as described with reference to FIG. 1 but different in that the mobile asset 50 includes a storage module 54 such as a battery coupled to the cyclo-converter via a rectifier/inverter block 52. Such configurations that include storage modules may be particularly useful in storing energy during regenerative braking. During normal operation the power 57 received by the secondary receiving coil may be transferred to the traction motor via the cyclo-converter. During braking, the traction motor delivers power 56 that may be used to charge the battery 54. Such regenerative power 56 may be routed to the battery 54 through the cyclo-converter and rectifier/inverter block 52. In one embodiment, power from the primary loop may be not available for the whole distance as in the case of trams within cities, the battery 54 supplies power 58 to the traction motor via rectifier/inverter block 52 and cyclo-converter. In an alternate configuration, the rectifier/inverter block 52 may be directly coupled to the filter block 32 instead of the cyclo-converter 28.

Figure 5:
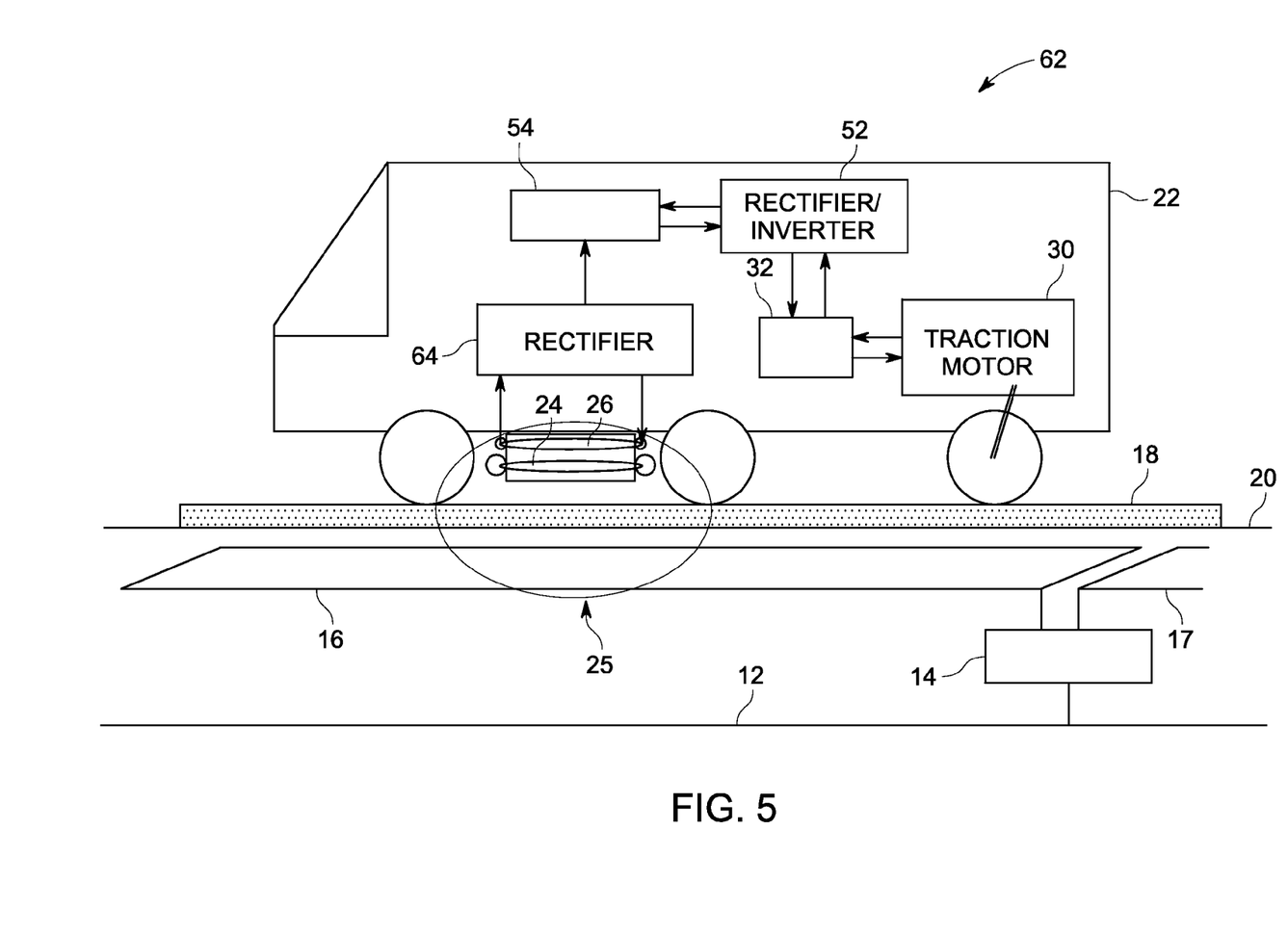
FIG. 5 illustrates a block diagram of a mobile asset configured for contactless power charging according to another embodiment of the invention.

FIG. 5 illustrates a block diagram of a mobile asset configured for contactless power charging according to an embodiment of the invention. The mobile asset 62 includes a secondary receiving coil to receive power from the primary loop and charge a storage module 54 via a rectifier 64. The storage module 54, for example, includes a battery or an array of batteries to store energy and deliver power to drive the traction motor. A rectifier/inverter block 52 may be coupled to the storage module 54 and configured to convert DC power into a suitable AC power to drive the traction motor. A filter may be coupled between the rectifier/inverter block 52 and the traction motor for filtering any surges/spikes that may appear at the output of the rectifier/inverter block 52.

Such configuration wherein the traction motors always run on batteries may be suitable for trams in cities wherein the distance between stations may be less compared to inter-city stations. Each station may be equipped with an underground charging device implementing a contactless power transfer system to charge the storage module as discussed in various embodiments of the invention.

Such contactless power transfer systems adapted to mobile assets may provide efficient power transfer system and may provide catenary free electric mobile asset operation. Such configurations may provide a system of connecting the contactless power to a traction motor in economical ways that help increase efficiency and reduce the cost of infrastructure. Field-focusing elements help enhanced contactless power transfer and may be robust to load variations. The power transfer efficiency may be somewhat unaffected by load variations. Contactless power transfer systems may handle bidirectional power transfer. Such a feature enables recovery of energy during some operational modes, such as dynamic braking. Some embodiments disclosed may reduce the cost of initial infrastructure installation by running the tram entirely from battery power and by using the contactless charging at stations.

The embodiments described herein are examples of structures, systems and methods having elements corresponding to the elements of the invention recited in the claims. This written description enables one of ordinary skill in the art to make and use embodiments having alternative elements that likewise correspond to the elements of the invention recited in the claims. The scope thus includes structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims are intended to cover all such modifications and changes.

The invention claimed is:

1. A system, comprising:
    a primary loop that is disposed adjacent to a location, that is coupled to a power source, and that is capable of transmitting power from the power source;
    a secondary receiving coil that is disposed on a mobile asset, that is coupled to a traction motor, and that is operable to receive power that the primary loop transmits; and
    a field-focusing element comprising a plurality of resonators arranged in an array that can focus a magnetic field from the primary loop onto the secondary receiving coil, wherein the field-focusing element has a non-linear current distribution.

2. The system of claim 1, wherein the primary loop is further coupled to an inverter, and the inverter is operable to convert direct current (DC) power into high-frequency alternative current (AC) power.

3. The system of claim 2, further comprising a cyclo-converter that is operable to convert the power received by the secondary receiving coil to a lower frequency power.

4. The system of claim 3, further comprising a filter coupled between the cyclo-converter and the traction motor.

5. The system of claim 2, wherein the cyclo-converter is further coupled to a storage module.

6. The system of claim 5, wherein the storage module is operable to receive power from the traction motor and to store the power received from the traction motor.

7. The system of claim 6, wherein the storage module is further operable to supply previously stored power to the traction motor.

8. The system of claim 1, wherein the field-focusing element is interposed between the primary loop and the secondary receiving coil.

9. The system according to claim 1, wherein the plurality of resonators are operable with two or more self-resonant frequencies.

10. The system according to claim 1, wherein the resonators are disposed within at least one of a dielectric medium, a magnetic medium, or a magneto-dielectric medium.

11. The system according to claim 1, wherein the field-focusing element is configured for bi-directional power transfer.

12. The system according to claim 1, wherein the field-focusing element comprises at least two sets of resonators.

13. The system according to claim 12, wherein each of the at least two sets of resonators comprises a self-resonant frequency that differs from each other of the sets of resonators.

14. The system according to claim 13, wherein the field-focusing element is operable to transfer power simultaneously at two or more self-resonant frequencies.

15. A method of transferring power comprising:
 transmitting power from a power source coupled to a primary loop onto a secondary receiving coil while focusing a magnetic field from the primary loop onto the secondary receiving coil,
 wherein the secondary receiving coil is disposed on a mobile asset and coupled to one or more traction motors for propelling the mobile asset, and converting the transmitted power into mechanical energy to propel the mobile asset; and
 converting mechanical energy to electrical energy and storing that electrical energy, transmitting that electrical energy, or both transmitting a portion of the electrical energy and storing a portion of the electrical energy wherein the stored energy can be transferred back to the power source.

16. A system, comprising:
 a primary loop that is disposed on a mobile asset, that is coupled to a power source secured to the mobile asset, and that is capable of transmitting power from the power source;
 a secondary receiving coil that is disposed at a distance from the primary loop, and that is operable to receive power that the primary loop transmits; and
 a field-focusing element comprising a plurality of resonators arranged in an array that can focus a magnetic field from the primary loop onto the secondary receiving coil, wherein the field-focusing element has a non-linear current distribution.

17. A locomotive configured to receive power wirelessly comprising:
 a wireless power transfer system comprising a secondary coil disposed on the locomotive to receive high frequency power from a primary loop disposed adjacent to a stationary track; and
 a field focusing element comprising a plurality of resonators arranged in an array, interposed between the primary loop and the secondary coil and configured to focus a magnetic field from the primary loop to the secondary coil, the field focusing element having a non-linear current distribution;
 a converter coupled to the secondary coil and configured to convert high frequency power to low frequency power suitable for driving one or more traction motors coupled to the locomotive and configured as a prime mover; and
 a storage module configured for storing and supplying power back to the power source.

* * * * *